(12) United States Patent
Ohra-aho et al.

(10) Patent No.: US 8,033,556 B2
(45) Date of Patent: Oct. 11, 2011

(54) COMBINED TRAMP ROD AND ANTI-ROLL BAR

(75) Inventors: Lauri Mikael Ohra-aho, Lara (AU); Simon Johnson, Lara (AU); Matthew J. Reilly, Point Cook (AU)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/688,099

(22) Filed: Jan. 15, 2010

(65) Prior Publication Data

US 2011/0175314 A1 Jul. 21, 2011

(51) Int. Cl.
 *B60G 21/05* (2006.01)
(52) U.S. Cl. ..... 280/124.106; 280/124.13; 280/124.149; 280/124.152
(58) Field of Classification Search ........... 280/124.106, 280/124.13, 124.149, 124.152
 See application file for complete search history.

(56) References Cited

U.S. PATENT DOCUMENTS

| 3,711,079 | A | * | 1/1973 | McJunkin, Jr. | 267/188 |
| 3,948,334 | A | * | 4/1976 | Danielson et al. | 180/24.13 |
| 3,990,725 | A | * | 11/1976 | Allison | 280/124.146 |
| 4,529,223 | A | * | 7/1985 | Maebayashi et al. | 280/5.521 |
| 5,636,857 | A | * | 6/1997 | Tandy et al. | 280/124.165 |
| 5,678,845 | A | * | 10/1997 | Stuart | 280/124.116 |
| 5,884,925 | A | | 3/1999 | Wong | |
| 5,954,353 | A | * | 9/1999 | Kincaid et al. | 280/124.152 |
| 6,149,166 | A | | 11/2000 | Struss et al. | |
| 6,254,114 | B1 | | 7/2001 | Pulling et al. | |
| 6,811,170 | B2 | | 11/2004 | Mosler | |
| 6,834,873 | B1 | * | 12/2004 | Vander Kooi et al. | 280/124.107 |
| 7,318,593 | B2 | * | 1/2008 | Sterly et al. | 280/124.106 |
| 7,559,563 | B2 | * | 7/2009 | Minoshima | 280/124.106 |
| 2008/0093817 | A1 | * | 4/2008 | Russell | 280/124.106 |

OTHER PUBLICATIONS

Larry Warren et al., Mitsubishi Pajero Automotive Repair Manual 1983 thru 1996, Haynes North America Inc. 1997, 2000, pp. 1-4.
Howstuffworks, How do stabilizer bars work?, Apr. 15, 2003, pp. 1-3.
Custom Auto Classifieds, www.zercustoms.com/photos/2008-Mitsubishi-Pajero-Sport-new-Detail, 2006, pp. 1-2.

* cited by examiner

*Primary Examiner* — Toan To
(74) *Attorney, Agent, or Firm* — Fredrick V. Owens; Brooks Kushman P.C.

(57) ABSTRACT

A combined tramp rod and anti-roll bar is secured between a rear axle beam and the chassis of a vehicle. The tramp rod and anti-roll bar has an intermediate portion, a right arm and a left arm that are connected by bushings to either the rear axle beam or the frame of the vehicle. The combined tramp rod and anti-roll bar provides roll stiffness control and also resists wind-up of the rear axle when high torque loads are applied to the rear axle. D-bushings that resist sliding movement of the intermediate portion in combination with the splayed arms provide improved compliance understeer performance when lateral loads are applied to the rear suspension.

12 Claims, 3 Drawing Sheets

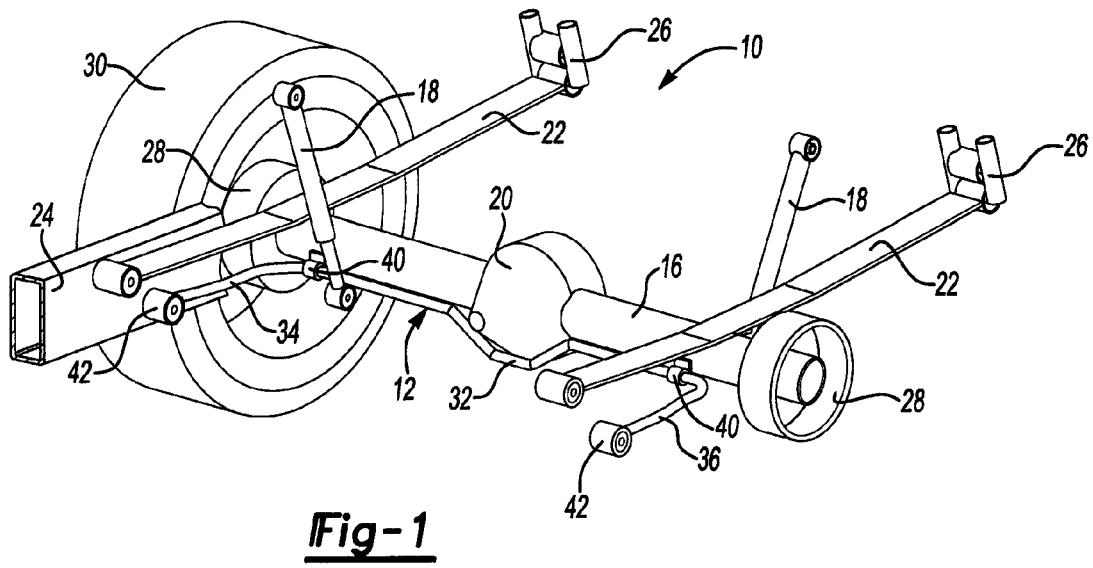
_Fig-1_
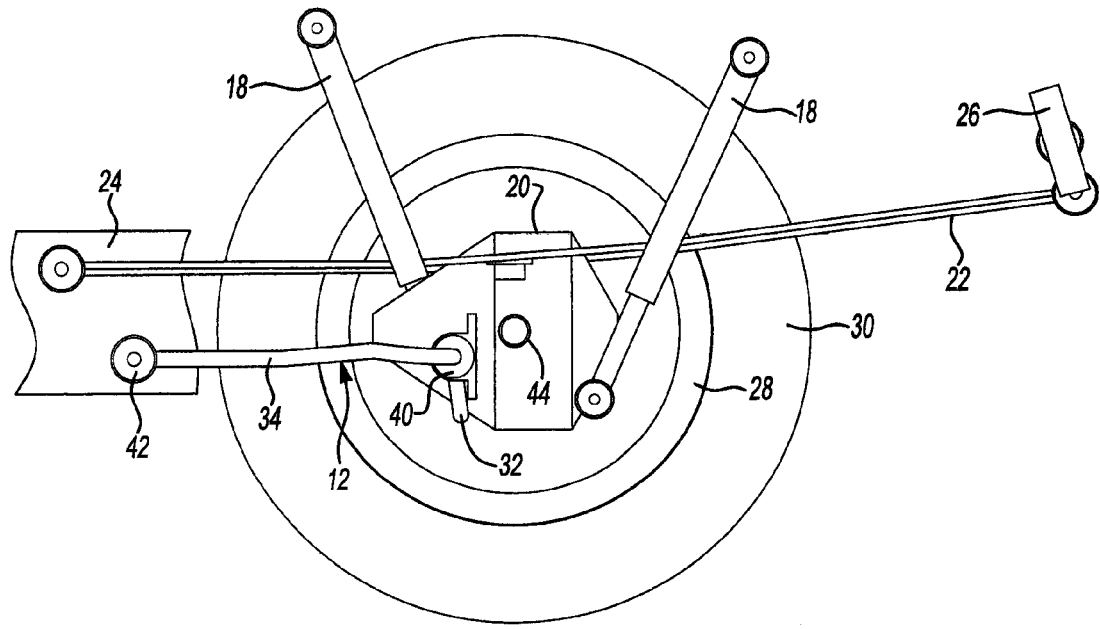
_Fig-2_

COMBINED TRAMP ROD AND ANTI-ROLL BAR

BACKGROUND

1. Technical Field

The present invention relates to mechanical linkages for reducing lateral roll and axle beam rotation.

2. Background Art

Suspension systems function to isolate the sprung mass of the vehicle from the unsprung masses comprising wheel and axle assemblies. Shock loading and vibration are reduced by springs and dampers. Mechanical linkages may be provided to improve the stability, steering and general handling performance of the vehicle.

Anti-roll bars, or stabiliser bars, are used to reduce the tendency of the vehicle body to roll or rotate about a longitudinal axis in a turn. During cornering, a typical passenger car may roll from 3-8° per g toward the outside of the turn. Too much roll is undesirable because it places difficulties for the driver to make accurate observations on the road conditions and the motion of the vehicle. Excessive roll may also interfere with steering performance and/or the stability of the vehicle.

An anti-roll bar is connected between left and right side of a suspension in such a manner that it is only articulated during opposite wheel motion i.e. suspension/vehicle roll, i.e. one wheel moving into bump (closer to vehicle body) and another into rebound (away from the vehicle body). The stiffness of the anti-roll bar reduces the amount of roll for a given change in vertical forces, or increases the load transfer for a given roll angle. Its stiffness is tuned to achieve desired levels of roll, and change the distribution of roll stiffness between front and rear axle.

Several ways to construct an anti-roll bar, or an anti-roll stiffness for a suspension are known from prior art. The most common set-up consists of a bar or an essentially wide U-shaped bar or beam mounted in front or behind a suspension. The arms of the U are connected to the opposite sides of the suspension, and the centre section to vehicle frame, subframe, or chassis. In a typical arrangement, the arms of the anti-roll bar are connected to a suspension member (for example, control arm, suspension strut, a knuckle, or axle) using a link with either bushings or ball joints at each end. The centre section is usually connected to the chassis using purpose-built bushings, sometimes referred to as D-blocks due to the characteristic shape of their cross-section. The shape is dictated by the fact that it first must be possible to mount the bush on the bar, and secondly because it is normally affixed on a flat surface by means of a clamp.

In the typical installation described above, the arms of the anti-roll bar are essentially loaded in bending, and the centre section essentially in torsion. Due to package constraints the centre section will sometimes be subjected to a combination of torsion and bending loads. On a live (or a dead beam) axle, the installation is often reversed, such that the centre section is connected to the axle, and the arms to the chassis.

Anti-roll bars are generally attached to suspension members using links of varying length, commonly referred to as drop links. The purpose of the drop link is to allow the anti-roll bar tip and suspension member to follow different trajectories during wheel travel, such that roll resistance is provided without introducing side loads on either the anti-roll bar or the suspension member.

Leaf spring live axle, also referred to as Hotchkiss suspension, is rarely used in modern passenger car applications, but it is still a common solution on light trucks and commercial vehicles. Its popularity is due to its cost-effectiveness and low overall system weight, resulting in a higher payload for a given gross vehicle weight than many other systems. Further, leaf spring divides the load to two attachment points on a chassis, which is favourable from durability point of view.

However, leaf spring suspensions suffer from the inherent disadvantage of relatively low wind-up stiffness, i.e. angular articulation of the axle (in side view) under driving/braking forces. The driving or braking torque is reacted on the leaf springs through axle housing. Under severe braking or acceleration, the leaf springs will presume an s-shape deformation. This articulation is undesirable, because it deteriorates road holding and traction through uncontrolled axle motion. Further, it has adverse NVH (noise, vibration and harshness) effects and poses additional stress on the driveshaft, which in extreme cases may lead to axle breakage if the joints are over-articulated. Thus it is desirable to minimise wind-up.

For a given vertical spring rate, it is possible to improve wind-up stiffness by making springs longer. However, this requires package space and adds mass to the vehicle. Also, this option will generally not be available on an existing vehicle platform where modification is desired, such as increased engine torque output. Tramp rods, also referred to as torque arms or radius arms, have historically been applied in vehicles equipped with a leaf-sprung live axle (normally rear) that produce high torque, particularly in high performance and racing car application. Tramp rod or rods—usually a single one or a pair per axle—are most commonly installed such that they extend parallel or nearly parallel to the leaf spring in forward direction. The tramp rod counteracts wind-up of the axle and differential caused by high torque loads. The length and position of the tramp rods have to be selected carefully, such that the installation will not be 'fighting' the motion of axle housing under normal wheel travel.

Another conventional means to improve wind-up performance is staggered installation of the dampers. In such arrangement, one of the dampers is located in front of the axle and inclined forward of the axle, while the other is behind the axle inclined rearward. Such arrangement is often used on overslung suspension. It does not increase wind-up stiffness, but generally results in better wind-up performance, because the articulation during transients is reduced. However, the asymmetric installation produces asymmetric motion ratios, leading to asymmetric vehicle response. Especially in laden condition the rearward damper will be less effective. Except for wind-up control, staggered installation is thus undesirable.

A further desired characteristic of a suspension system is compliance understeer. On a rear suspension, compliance understeer is achieved when a cornering (lateral) force applied on outside corner wheel causes the axle to toe-in. In practice, this is difficult to achieve on a conventional leaf spring suspension. Panhard rod or Watt's linkage have previously been applied, but it is often difficult to find either the package or, on a vehicle with ladder frame, a sufficiently stiff mounting point.

These problems, and possibly other problems, are addressed by applicants as summarized below.

SUMMARY

According to one aspect of the applicants' disclosure, a combined anti-roll bar and tramp rod are provided for a vehicle. A stabilizer bar having right and left arms and an intermediate portion provides the combined function of an anti-roll bar and a pair of tramp rods. The bar includes an intermediate portion and right and left arms that extend generally in the fore-and-aft vehicle direction. The arms of the bar are directly secured by bushings or ball joints to the chassis of the vehicle without any intervening drop links.

Combining the functions of an anti-roll bar and a pair of tramp rods is achieved by the deletion of anti-roll bar links (drop links) and carefully selected location of the attachment points, while limiting the complexity of the system. Prior art anti-roll bars have not been used to control wind-up. Increased wind-up stiffness will thus allow the use of parallel damper installation on a suspension.

By eliminating the drop links and directly connecting the arms of the bar to the chassis, axle beam rotation, or wind-up, can be impeded without providing a separate set of tramp rods.

The combined anti-roll bar and tramp rod may be provided with D-blocks or bushings that secure the bar to an axle beam and may also provide compliance understeer resulting in the outside tire steering into the cornering radius (toe-in).

With the anti-roll bar installation described below, compliance understeer, or as a minimum, a reasonable reduction of compliance oversteer, can be realised. This can be achieved by splaying the arms of the anti-roll bar out and forward in plan view. Under lateral force, the lateral displacement of the axle induces a toe-correcting effect on the axle.

These and other features of the combined tramp rod and anti-roll bar disclosed in this application will be better understood in view of the attached drawings and the following detailed description of the illustrated embodiments.

BRIEF DESCRIPTION OF THE DRAWINGS

FIG. 1 is a front/side fragmentary perspective view of a rear suspension including the combined tramp rod and anti-roll bar;

FIG. 2 is a side elevation view of the combined tramp rod and anti-roll bar shown in FIG. 1;

DETAILED DESCRIPTION

Figure 3:
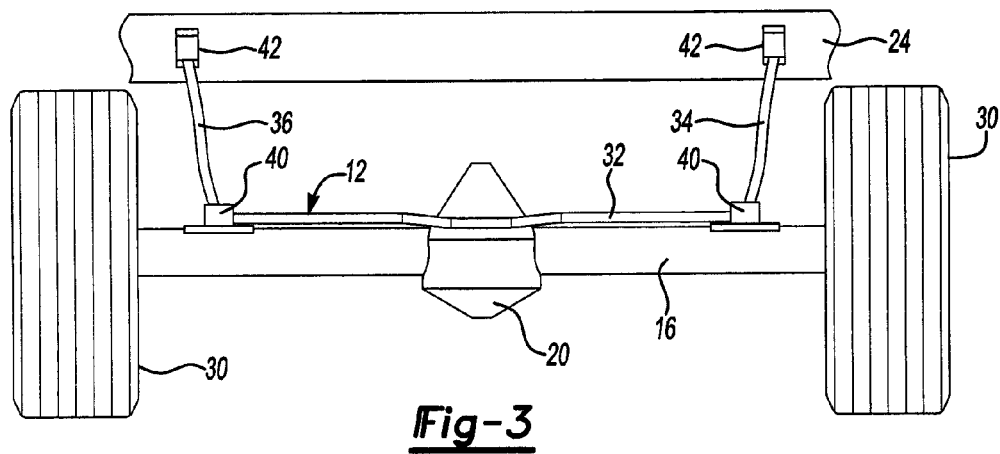
FIG. 3 is a bottom plan view of the combined tramp rod and anti-roll bar shown in FIG. 1.

Referring to FIG. 1, a rear suspension system generally indicated by reference numeral 10 is shown with the vehicle and several component parts not being illustrated to provide better visibility of the components of the suspension system 10 that are material to the illustrated combined tramp rod and anti-roll bar 12.

The tramp rod and anti-roll bar 12 is assembled to a rear axle beam 16. Dampers 18, or shock absorbers, are secured between the rear axle beam 16 and the body of the vehicle (not shown). A differential 20 is provided on the axle beam 16. Torque is delivered through a driveshaft (not shown) to the differential 20. Leaf springs 22 are provided on opposite sides of the rear suspension system 10. The rear axle beam 16 in FIG. 1 is shown in an overslung arrangement wherein the rear axle 16 is below the leaf springs 22. A frame rail 24 is partially shown in FIG. 1. It should be understood that the frame rail 24 is part of the vehicle chassis that is not otherwise shown. The frame rail 24 may be an integral frame rail that is part of a unibody vehicle. Leaf spring brackets 26 (shackles) are provided to secure the rear ends of the leaf springs 22 to the vehicle chassis or frame.

A wheel 28 is shown on both sides of the rear axle beam 16 with a tire 30 being illustrated on the right side wheel 28. The tire on the left side of the vehicle is not shown so that the other parts of the suspension system 10 may be more easily observed.

The tramp rod and anti-roll bar 12 includes an intermediate portion 32, or transverse portion, that extends between a right arm 34 and a left arm 36. A bushing 40, referred to as D-block, is used to secure the intermediate portion 32 of the tramp rod and anti-roll bar 12 to the rear axle beam 16. A pair of bushings 40 is provided at or near the juncture of the arms 34, 36 and the intermediate portion 32. Bushings 42 are provided at the ends of the arms 34 and 36 and are spaced from the intermediate portion 32. The arms 34 and 36 are connected by the bushings 42 to the frame rails 24 directly. It is important to note that the ends of the arms 34 and 36 are not connected to drop links which would be the conventional way of connecting an anti-roll bar to a vehicle chassis. By eliminating the drop links of conventional anti-roll bars, the combined anti-roll bar function and tramp rod function may be provided by this unique mounting arrangement for the tramp rod and anti-roll bar 12.

Referring to FIG. 2, the rear suspension system shown in FIG. 1 including the tramp rod and anti-roll bar 12 is shown in a diagrammatic side elevation view. In FIG. 2, the rear axle beam 16 is not depicted so that the rear axle 44 may be shown more clearly as it extends from the differential 20. The leaf springs are supported by the brackets (shackles) 26. The bushing 42 is shown connecting the right arm 34 to the frame rail 24. The intermediate portion 32 of the tramp rod and anti-roll bar 12 is shown extending below the differential 20. The bushing 40 connects the intermediate portion 32 to the rear axle beam 16 (not shown in FIG. 2).

Referring to FIG. 3, the tramp rod and anti-roll bar 12 is shown with the arms 34 and 36 being connected to a frame rail 24 that extends in a transverse orientation relative to the vehicle. The ends of the arms 34 and 36 are secured by bushings 42 to the frame rail 24. The tramp rod and anti-roll bar 12 is secured to the rear axle beam 16 by the bushings 40. The bushings 40 are located at the intersection of the intermediate portion 32 and the right and left arms 34 and 36. The intermediate portion 32 extends below the differential 20. This embodiment is intended to be used with an overslung rear axle i.e. where axle 16 located below the leaf springs (not shown in FIG. 3).

Figure 4:
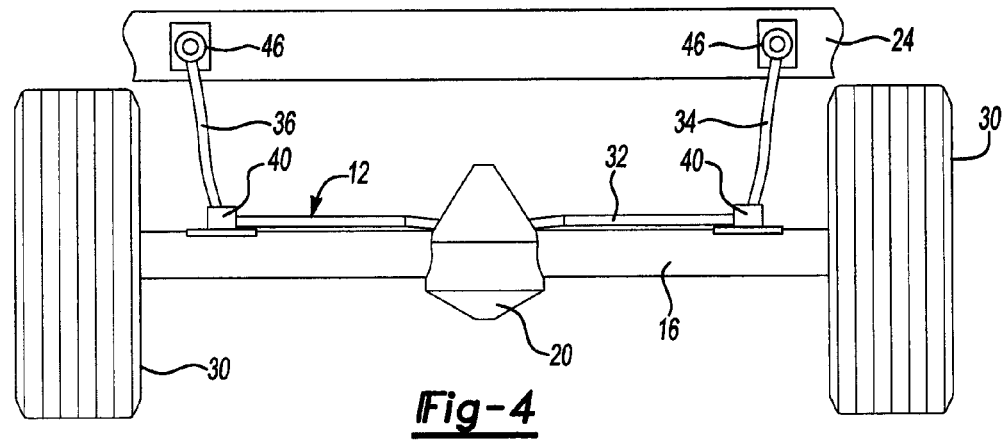
FIG. 4 is a bottom plan view of an alternative embodiment of the combined tramp rod and anti-roll bar for use with a rear axle that is secured to the vehicle above the axle and differential and is intended to be used with the suspension having leaf springs mounted above the rear axle beam.

Referring to FIG. 4, an alternative embodiment is shown wherein the tramp rod and anti-roll bar 12 is secured to the rear axle beam 16 by bushings 40 with the intermediate portion 32 extending above the differential. This embodiment is intended to be used with an underslung rear axle where the axle 16 is located over the leaf springs (not shown in FIG. 4). The right and left arms 34 and 36 are secured to ball joints 46 that secure the arms 34 and 36 to the frame member 24.

Figure 5:
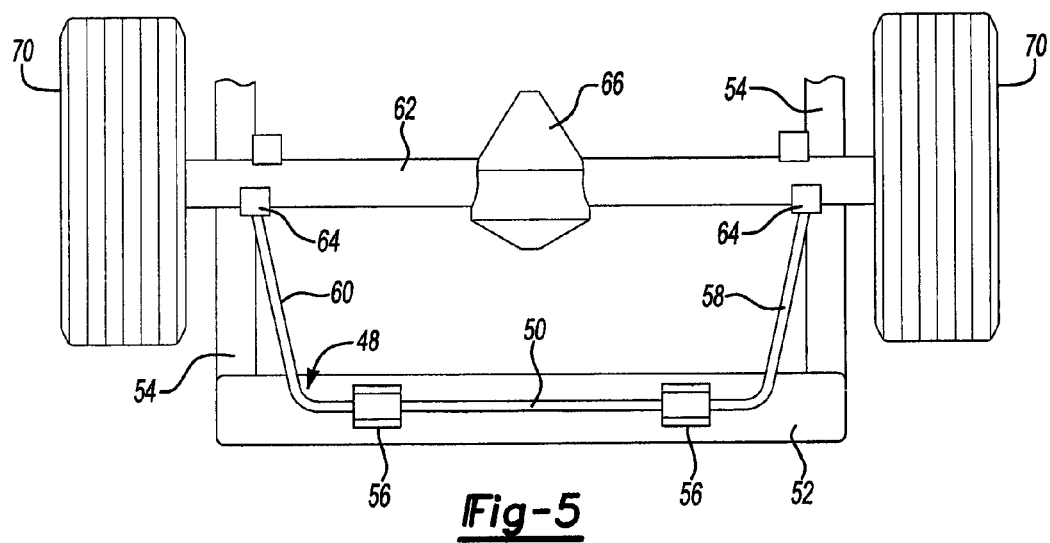
FIG. 5 is another alternative embodiment in which the combined tramp rod and anti-roll bar is secured with the intermediate or transverse portion secured to the chassis of the vehicle with the right and left arms of the combined tramp rod and anti-roll bar attached to the rear axle beam.

Referring to FIG. 5, an alternative embodiment of a tramp rod and anti-roll bar 48 is illustrated in which the intermediate portion 50, or transverse portion, is secured to a transversely extending frame beam 52. The transversely extending frame beam 52 is secured between parallel frame rails 54 in the illustrated embodiment. The tramp rod and anti-roll bar 48 includes a right arm 58 and a left arm 60. The right arm 58 and left arm 60 are attached to a rear axle beam 62. A pair of bushings 64 is provided on opposite sides of a differential 66. The bushings 64 secure the right arm 58 and the left arm 60 to the rear axle beam 62 between the differential 66 and the tires 70. In this embodiment, the anti-roll function and the anti-rotation function of a tramp rod may be performed by the tramp rod and anti-roll bar 48.

Figure 6:
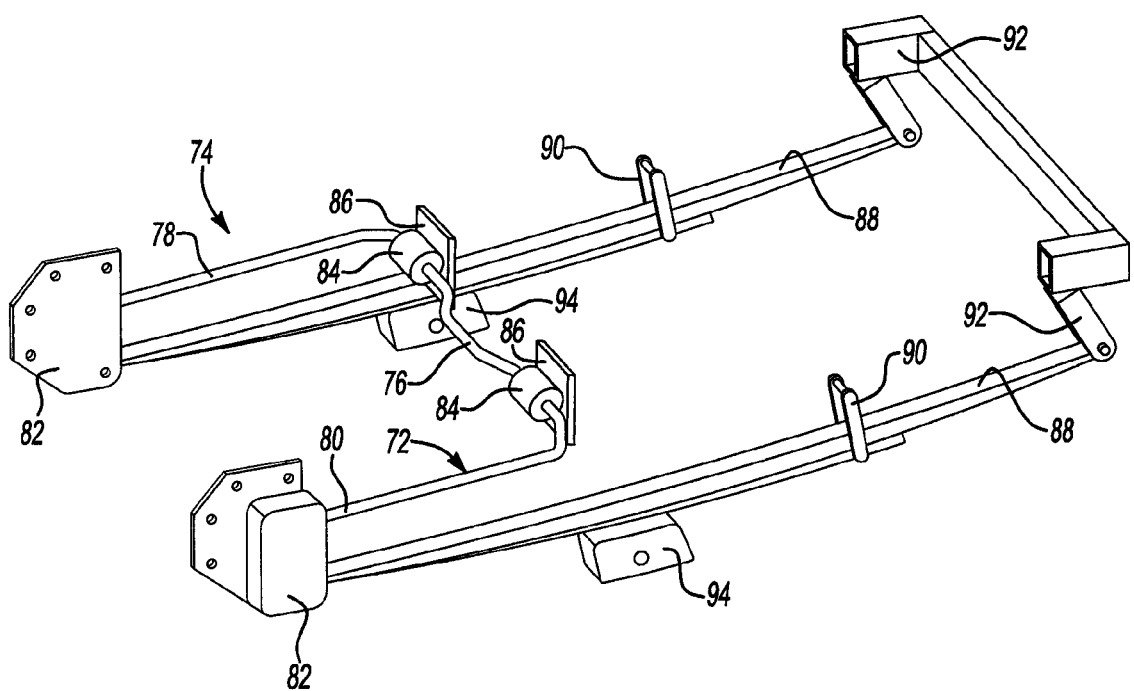
FIG. 6 is a side front perspective view of an alternative embodiment of the combined tramp rod and anti-roll bar having right and left arms attached to bushings in the bracket blocks that are attached between the vehicle frame and the rear axle beam.

Referring to FIG. 6, yet another embodiment of a tramp rod and anti-roll bar 72 is illustrated. A tramp rod system 74 is illustrated in FIG. 6. The tramp rod and the anti-roll bar 72 include a transverse portion 76, a right arm 78 and a left arm 80. Cast bracket blocks 82 are provided that receive the right arm 78 and the left arm 80 on bushings (not shown). The D-bushings 84 are secured to the transverse portion 76 of the tramp rod and anti-roll bar 72. The D-bushings 84 include plates 86 that are used to secure the transverse portion to a rear axle beam (not shown in FIG. 6). Leaf springs 88 extend from the bracket blocks 82 in a rearward direction. Spring hangers 90 are provided to support helper leaf spring. A rear spring mounting bracket 92 is provided to support the rear ends of the leaf springs 88. An axle bracket 94 is provided to support the axle (not shown) below the leaf springs 88.

As shown in FIGS. 3-5, the arms 34, 36 and 58, 60 may be splayed laterally outward from the respective intermediate portion 32, 50. Splaying the arms improves compliance understeer as compared to conventional anti-roll bar designs, where anti-roll bar is connected to the chassis (or axle, as the case may be) through drop links. When the arms are not splayed outward, the amount of compliance understeer is reduced.

The bushings 40, 56, and 84 may include gripping features such as cooperating ribs that grip the tramp rod and anti-roll bars 12, 48, and 72 to a greater extent to provide a compliance understeer. Compliance understeer is created when lateral forces are applied to a suspension in a turn. For example, a lateral force applied on a right rear wheel while making a left cornering turn, handling is improved by causing the outside tire to steer into the corner. Compliance understeer results in a stabilization of the vehicle in the turn. The D-bushings used to secure the intermediate portions of the bars to the rear axle beam may be smooth. If smooth or sliding type D-bushings are used, the compliance understeer advantage of the invention is not expected to be realized.

By not providing drop links between the ends of the arms and the chassis, the tramp rod and anti-roll bars 12, 48 and 72 also serve to provide the tramp rod function. Drop links are conventionally used to secure the ends of an anti-roll bar to a chassis tend to compensate for longitudinal motion between the frame and the two arms, which prevents the arms from functioning as tramp rods.

What is claimed:

1. A tramp rod and anti-roll bar, in combination, for a vehicle having an axle beam, a leaf spring and a chassis, the combined tramp rod and anti-roll bar comprising:
    a generally U-shaped bar having a right arm and a left arm that are connected by a transverse portion, wherein the arms extend in the fore-and-aft vehicle direction, and wherein the leaf spring is disposed below the axle beam and the transverse portion is disposed above the axle beam;
    a right D-block secured to the axle beam and to the transverse portion adjacent to the right arm;
    a left D-block secured to the axle beam and to the transverse portion adjacent to the left arm;
    a right side bushing secured at a location spaced from the transverse portion to the right arm and to the chassis; and
    a left side bushing secured at a location spaced from the transverse portion to the left arm and to the chassis.

2. The combination of claim 1 wherein the right arm and left arm are splayed outwardly from the transverse portion to the chassis to improve compliance under-steer.

3. The combination of claim 1 wherein the right arm and left arm extend toward the front of the vehicle.

4. The combination of claim 1 wherein the right D-block and the left D-block are provided with surface features that enhance the grip of the D-blocks on the transverse portion.

5. A tramp rod and anti-roll bar, in combination, for a vehicle having an axle beam, a leaf spring and a chassis, the combined tramp rod and anti-roll bar comprising:
    a generally U-shaped bar having a right arm and a left arm that are connected by a intermediate portion that extends in a transverse vehicle direction, the right arm and the left arm extend in the fore-and-aft vehicle direction;
    a right D-block secured to the axle beam and to the intermediate portion adjacent to the right arm;
    a left D-block secured to the axle beam and to the intermediate portion adjacent to the left arm; and
    a right side ball joint secured at a location spaced from the transverse portion to the right arm and directly to the chassis; and
    a left side ball joint secured to the left arm and to directly the chassis at a location spaced from the transverse portion.

6. The combination of claim 5 wherein the right arm and left arm are splayed outwardly from the transverse portion to the chassis to improve compliance under-steer.

7. The combination of claim 5 wherein the right arm and left arm extend toward the front of the vehicle.

8. The combination of claim 5 wherein the right D-block and the left D-block are provided with surface features that enhance the grip of the D-blocks on the transverse portion.

9. A tramp rod and anti-roll bar, in combination, for a vehicle having an axle beam, a leaf spring and a chassis, the combined tramp rod and anti-roll bar comprising:
    a generally U-shaped bar having a right arm and a left arm that are connected by a transverse portion, wherein the arms extend in the fore-and-aft vehicle direction;
    a right D-block secured to the transverse portion and to the chassis adjacent to the right arm;
    a left D-block secured to the transverse portion and to the chassis adjacent to the left arm; and
    a right side bushing secured at a location spaced from the transverse portion to the right arm and directly to the axle beam; and
    a left side bushing secured at a location spaced from the transverse portion to the left arm and directly to the axle beam.

10. The combination of claim 9 wherein the chassis further comprises a transverse beam that extends in a parallel direction relative to the axle beam and wherein the transverse portion of the U-shaped bar is secured by the right D-block and the left D-block to the transverse beam.

11. A tramp rod and anti-roll bar, in combination, for a vehicle having an axle beam, a leaf spring and a chassis, the combined tramp rod and anti-roll bar comprising:
    a generally U-shaped bar having a right arm and a left arm that are connected by a transverse portion, wherein the arms extend in the fore-and-aft vehicle direction;
    a right D-block secured to the transverse portion and to the chassis adjacent to the right arm;

a left D-block secured to the transverse portion and to the chassis adjacent to the left arm; and a right side ball joint secured at a location spaced from the transverse portion to the right arm and directly to the axle beam; and a left side ball joint secured at a location spaced from the transverse portion to the left arm and directly to the axle beam.

12. The combination of claim 11 wherein the chassis further comprises a transverse beam that extends in a parallel direction relative to the axle beam and wherein the transverse portion of the U-shaped bar is secured by the right D-block and the left D-block to the transverse beam.

* * * * *